United States Patent [19]

Krummheuer et al.

[11] Patent Number: 5,093,163
[45] Date of Patent: Mar. 3, 1992

[54] UNCOATED FABRIC FOR AIRBAGS

[75] Inventors: Wolf Krummheuer, Wuppertal; Hans A. Graefe, Schwelm; Volker Siejak, Duisburg, all of Fed. Rep. of Germany

[73] Assignee: AKZO N.V., Netherlands

[21] Appl. No.: 578,266

[22] Filed: Sep. 6, 1990

[30] Foreign Application Priority Data

Sep. 7, 1989 [DE] Fed. Rep. of Germany ....... 3929807
Sep. 7, 1989 [DE] Fed. Rep. of Germany ....... 3929810
Jul. 25, 1990 [DE] Fed. Rep. of Germany ....... 4023564

[51] Int. Cl.$^5$ ............................................. B60R 21/16
[52] U.S. Cl. ................................. 428/35.1; 428/225; 280/741; 280/743; 280/728
[58] Field of Search ................ 428/34.9, 225, 35.1; 280/741, 743, 728

[56] References Cited

U.S. PATENT DOCUMENTS

| | | | |
|---|---|---|---|
| 3,799,574 | 3/1974 | Bonn et al. | 250/150 AB |
| 3,842,583 | 10/1974 | Gage | 57/140 R |
| 3,888,504 | 6/1975 | Bonn et al. | 280/150 |
| 4,921,735 | 5/1990 | Bloch | 428/34.9 |
| 4,932,107 | 7/1990 | Gotoh et al. | 28/137 |

FOREIGN PATENT DOCUMENTS

| | | |
|---|---|---|
| 974745 | 9/1975 | Canada . |
| 0314867 | 5/1988 | European Pat. Off. . |
| 0286246 | 10/1988 | European Pat. Off. . |
| 0302449 | 8/1989 | European Pat. Off. . |
| 2164627 | 7/1972 | Fed. Rep. of Germany . |
| 8714595 | 3/1988 | Fed. Rep. of Germany . |
| 1-104848 | 4/1989 | Japan . |

*Primary Examiner*—James J. Seidleck
*Assistant Examiner*—Charles R. Nold
*Attorney, Agent, or Firm*—Oliff & Berridge

[57] ABSTRACT

A heat shrinkable uncoated fabric of synthetic filament yarn for the production of airbags is produced with an at least substantially symmetric fabric contruction. A yarn with a titre of 300-400 dtex is used.

15 Claims, No Drawings

UNCOATED FABRIC FOR AIRBAGS

TECHNICAL FIELD

This invention relates to a heat shrinkable, uncoated fabric of synthetic filament yarn for the production of an air bag.

BACKGROUND OF THE INVENTION

Air bags have hitherto been produced mainly from coated fabrics, but it has been found that these fabrics have considerable disadvantages for the production of air bags. Apart from the higher production costs required for coating the fabrics, the folded volume of the coated fabrics is at least 10% greater than that of uncoated fabrics. The space requirement for accommodating the air bag, for example in the steering wheel, is therefore higher when the fabrics are coated than when they are uncoated. Moreover, air bags of coated fabrics result in a greater imbalance in the steering wheel than those produced from uncoated fabrics. Another special disadvantage arises from the necessity of applying talc to the coating to prevent the different layers of coated fabric from sticking together when the air bag is folded up. When the air bag is operated, the talc from the air bag causes considerable discomfort to the passengers.

There is therefore a need to develop uncoated fabrics which could be used for the production of air bags without the disadvantages of the coating described above.

Such a fabric is described in EP-A 314,867, in which a yarn having a titre of 470 dtex is proposed for a fabric with an asymmetric fabric construction. The low permeability to air required of these fabrics is obtained by thermofixing in combination with calendering. One of the major disadvantages of the fabrics with asymmetric construction described in said specification is that the same strengths cannot be obtained in both thread directions. Moreover, the titre of 470 dtex is not advantageous for ease of folding of the fabric.

An asymmetric fabric having a titre in the range of from 110 to 900 dtex is described in U.S. Pat. No. 3,842,583, but the yarn used in that fabric has insufficient strength and too high elongation. With yarns of this type it is not possible to fulfill the specifications nowadays demanded by European motor car manufacturers. These asymmetric fabrics also have the further disadvantage of difference in strength between warp and weft.

Fabrics for air bags produced from yarns with titres of 235 dtex (210den) or 470 dtex (420 den) are described in JP-A 01-104,848 (see Examples).

Whereas the titre of 235 dtex does not provide the necessary strength, the titre of 470 dtex has the disadvantage already mentioned above of producing a fabric with too great a folding volume.

The problem therefore arose of developing an uncoated air bag fabric which would be more suitable and inexpensive to produce.

SUMMARY OF THE INVENTION

It has now surprisingly been found that a more suitable uncoated air bag fabric may be obtained by using a synthetic filament yarn with titres in the range of from 300 to 400 dtex and giving the fabric an at least substantially symmetric construction.

DETAILED DESCRIPTION OF PREFERRED EMBODIMENTS

A fabric having the same strength in both thread directions is advantageously obtained by using a fabric construction which is at least substantially symmetrical, with identical or almost identical thread counts in warp and weft and yarns of the same titre and the same technological properties (strength, etc.) in both thread directions. This property of the fabric of being equally strong in both thread directions is of great advantage because the air bag, which is a radially symmetrical structure, then has no preferential direction of stress.

Other conceivable measures for obtaining equal strengths in both thread directions have very deleterious effects on other properties of the fabric, such as the air permeability and the ease of folding, and are therefore hardly suitable.

Further advantages, such as the low thickness of the fabric, small volume when folded up and hence small space requirement for accommodating the air bag in the steering wheel and ease of folding can thus be achieved very simply together with good strength properties by using a yarn titre of 300 to 400 dtex, preferably 320 to 380 dtex, more preferably 340 to 360 dtex.

Although yarn titres of 470 dtex hitherto used fulfill the requirements for strength, the thickness of the resulting fabric and the resulting high bulk of the folded fabric are very disadvantageous. A thinner fabric is obtained with a titre of 235 dtex, which has also been proposed for air bags, but with such a titre the requirements for strength cannot be fulfilled with the necessary constancy and reliability, if at all.

The invention, on the other hand, achieves the desired high strength combined with the least possible weight per unit area by using a yarn in a titre range of from 300 to 400 dtex which has not hitherto been known for the manufacture of air bags. The Table below shows a comparison between the titres of 470, 350 and 235 dtex.

TABLE

| Yarn titre (dtex) | 470 f 72 | 350 f 72 | 235 f 36 |
| --- | --- | --- | --- |
| Thickness (mm) | 0.38 | 0.31 | 0.23 |
| Weight per unit area (g/m²) | 243 | 200 | 179 |
| Strength (N) | | | |
| Warp | 3330 | 2900 | 2300 |
| Weft | 3100 | 2900 | 2400 |
| Tear propagation resistance (N) according to Schenkel | | | |
| Warp | 130 | 94 | 67 |
| Weft | 133 | 93 | 62 |
| Air permeability (liters/dm².min) 500 Pa | 4.9 | 3.4 | 3.5 |

The above Table shows that although the titre of 235 dtex provides a sufficiently thin fabric, the strength required by motor car manufacturers cannot be achieved with this titre. The fabric with a titre of 470 dtex even exceeds the required strength but the fabric is too thick. A suitable fabric thickness combined with the required strength greater than 2400N is achieved by means of the titre of 350 dtex according to the invention.

A particularly suitable yarn combines a titre of 350 dtex with a strength of at least 60 cN/tex, an elongation of 15 to 30% and a hot air shrinkage of at least 6%

(determined at 190° C.). With such a yarn, therefore, the specifications issued by motor car manufacturers are for the first time completely fulfilled in a particularly advantageous manner with uncoated fabrics.

The air permeability is particularly important for the function of the air bag. According to more recent specifications, motor car manufacturers demand a value of $$\leq 10 \frac{\text{liters}}{\text{dm}^2 \cdot \text{min}}$$

at a test pressure $\Delta p$ of 500 Pa. With the air bag fabrics hitherto known, this value can only be achieved by applying an additional coating or by a calendering treatment.

The test for air permeability of the fabric according to the invention was carried out according to DIN 53 887. The test differed from that of this DIN Standard, however, in that the pressure difference was increased to 500 Pa in order to obtain an unequivocal test signal for the fabrics produced according to the invention.

For conforming to the standards demanded by the motor car manufacturers, it is particularly advantageous to use a fabric construction which is at least substantially symmetrical.

An at least substantially symmetrical fabric construction may, in the context of the present invention, be either a fabric construction which has the same number of threads in warp and weft and is thus symmetrical, or it may be a fabric construction with almost equal thread counts in warp and weft. Tests have shown that the advantageous properties and effects of symmetrical fabric are still obtained if the thread counts in warp and weft differ from one another by, for example, about 10%.

The fabric construction should be chosen to provide a very dense fabric. Thread counts of from 23 to 28/cm in warp and weft have proved to be suitable for the yarn titres according to the invention. All weaving machines conventionally used in weaving technology are suitable for the production of the fabrics.

The number of individual filaments in the filament yarn is important for achieving the desired properties. For a yarn titre of 300–400 dtex it is particularly advantageous to use a yarn with 72 individual filaments. The individual titre, which is then lower than that of a yarn of 470 f 72 or 235 f 36, has a particularly advantageous effect on the stiffness of the fabric, i.e. the stiffness is reduced and the foldability is improved. In addition, a lower individual titre results in a fabric with lower air permeability.

The air bag fabric may be produced from any synthetic filament yarn which has the above-mentioned values for strength, elongation and shrinkage, but yarns of Polyamide 6.6 have proved to be particularly suitable. A Polyamide 6.6 into which a heat stabilizer has been introduced during production of the polymer is particularly preferred. These yarns may be produced either by a conventional production process in which the yarn is wound between the stages of spinning and stretching or by a continuous spinning-stretching process. The yarns may be used twisted or twist-free.

If the fabric produced with an at least substantially symmetrical construction is subjected to a desizing and-/or washing process, this wet treatment releases the shrinkage. Further shrinkage may then be obtained in a heat setting plant. Reduction in air permeability may be achieved by a Sanforizing or calendering process.

Fabrics which have been thus treated have the requisite low air permeability.

The advantages of the fabric according to the invention result in a safer and more reliable air bag system which conforms to the specifications of the motor car manufacturers and is therefore saleable. The air bag system comprises the air bag itself, the accommodation for the air bag in the vehicle, and the control system for releasing the air bag function.

EXAMPLE

A Polyamide 6.6 yarn having a titre of 350 f 72 was worked up into a fabric with linen weave. The thread count was 27/cm in the warp and 26/cm in the weft. The fabric was washed on a jig and then heat set on a stenter frame at 190° C. It was then treated on a Sanforizing finishing machine. The air bag fabric thus produced was found to have a thickness of 0.31 mm and a weight per unit area of 200 g/m$^2$. The strength was 2900 N in both thread directions and thus within the desired range, and the air permeability was found to be 3.4 liters/dm$^2$·min and thus also within the required range.

We claim:

1. A heat shrinkable or heat shrunk uncoated fabric for the production of an air bag, said fabric having an at least synthetic filament substantially symmetrical construction and being formed of yarn having a titre of from 300 to 400 dtex.

2. A fabric according to claim 1, wherein the yarn has a titre of from 320 to 380 dtex.

3. A fabric according to claim 1, wherein the yarn has a titre of from 340 to 360 dtex.

4. A fabric according to claim 1, wherein the yarn has a titre of 350 dtex.

5. A fabric according to claim 1, wherein said fabric is heat shrunk by passage through at least one of a washing and a desizing apparatus and optionally by a following heat fixing.

6. A fabric according to claim 1, wherein said fabric has been subjected to a Sanforizing or calendering process to reduce air permeability of said fabric.

7. A fabric according to claim 1, wherein said fabric has an air permeability no greater than ten liters/dm$^2$·min.

8. An air bag comprising a heat shrinkable or heat shrunk uncoated fabric of synthetic filament yarn, said fabric having an at least substantially symmetrical construction and the yarn having a titre of from 300 to 400 dtex.

9. An air bag according to claim 8, wherein the yarn has a titre of from 320 to 380 dtex.

10. An air bag according to claim 8, wherein the yarn has a titre of from 340 to 360 dtex.

11. An air bag according to claim 8, wherein the yarn has a titre of 350 dtex.

12. An air bag according to claim 8, wherein said fabric is heat shrunk by passage through at least one of a washing and a desizing apparatus and optionally by a following heat fixing.

13. An air bag according to claim 8, wherein said fabric has been subjected to a Sanforizing or calendering process to reduce air permeability of said fabric.

14. An air bag according to claim 8, wherein said fabric has an air permeability no greater than ten liters/dm$^2$·min.

15. An air bag system comprising an air bag which comprises a heat shrinkable or heat shrunk fabric or synthetic filament yarn, said fabric having an at least substantially symmetrical construction and said yarn having a titre of from 300 to 400 dtex.

* * * * *

UNITED STATES PATENT AND TRADEMARK OFFICE
CERTIFICATE OF CORRECTION

PATENT NO. : 5,093,163
DATED : March 3, 1992
INVENTOR(S) : Wolf KRUMMHEUER et al.

It is certified that error appears in the above-identified patent and that said Letters Patent is hereby corrected as shown below:

ON THE TITLE PAGE

IN THE ABSTRACT:

Line 3, change "contruction" to --construction--.

IN THE SPECIFICATION:

Col. 1, line 52, change "(210den)" to --(210 den)--.

IN THE CLAIMS:

Claim 1, col. 4, line 25, delete "synthetic filament";

line 26, after "of" insert --synthetic filament--.

Claim 15, col. 4, line 64, change "or" (2nd occur.) to --of--.

Signed and Sealed this

Eighth Day of June, 1993

Attest:

MICHAEL K. KIRK

Attesting Officer

Acting Commissioner of Patents and Trademarks